United States Patent
Crosby, II

[11] Patent Number: 6,025,796
[45] Date of Patent: Feb. 15, 2000

[54] RADAR DETECTOR FOR PRE-IMPACT AIRBAG TRIGGERING

[76] Inventor: Robert G. Crosby, II, 1429 Lynoak Dr., Claremont, Calif. 91711

[21] Appl. No.: 08/761,942

[22] Filed: Dec. 9, 1996

[51] Int. Cl.[7] .................................................. G01S 13/93
[52] U.S. Cl. ............................................. 342/70; 342/72
[58] Field of Search ................................. 342/70, 71, 72, 342/69

[56] References Cited

U.S. PATENT DOCUMENTS

| | | | |
|---|---|---|---|
| 3,760,415 | 9/1973 | Holmstrom et al. | 342/59 |
| 3,851,305 | 11/1974 | Baba et al. | 342/455 X |
| 3,860,923 | 1/1975 | Yamanaka et al. | 342/72 |
| 3,864,678 | 2/1975 | Yamanaka et al. | 342/59 |
| 3,874,476 | 4/1975 | Monaghan | 280/753 |
| 3,888,329 | 6/1975 | Monaghan | 280/734 |
| 3,981,518 | 9/1976 | Pulling | 280/730.1 |
| 4,143,370 | 3/1979 | Yamanaka et al. | 342/72 |
| 5,161,820 | 11/1992 | Vollmer | 280/730 |
| 5,162,794 | 11/1992 | Seith | 340/903 |
| 5,364,125 | 11/1994 | Brown et al. | 280/730 A |
| 5,463,384 | 10/1995 | Juds | 340/903 |
| 5,467,072 | 11/1995 | Michael | 340/436 |
| 5,482,314 | 1/1996 | Corrado et al. | 280/735 |
| 5,528,698 | 6/1996 | Kamei et al. | 382/100 |
| 5,559,697 | 9/1996 | Wang | 364/424.05 |
| 5,583,511 | 12/1996 | Hulderman | 342/175 |
| 5,598,164 | 1/1997 | Reppas et al. | 342/70 |
| 5,613,039 | 3/1997 | Wang et al. | 395/22 |
| 5,638,281 | 6/1997 | Wang | 364/461 |
| 5,646,612 | 7/1997 | Byon | 340/903 |

Primary Examiner—John B. Sotomayor
Attorney, Agent, or Firm—Leo R. Carroll

[57] ABSTRACT

A pulsed radar detector to be used for airbag triggering prior to a collision between a vehicle on a roadway and an impacting target object, has sets of transmitters and receiver separately disposed on a the side of a vehicle so as to create a bistatic antenna pattern. The transmitting antennae are mounted relative to receiving antennae so as to control the amount of direct radiation from each transmitter antenna and said receiver antenna so as to create a modulation of a received target signal. A signal processor determines the period of the modulation in order to obtain a measure of target velocity. The amplitude of the modulation is determined so as to have a measure of relative target size. Using this data, a computer continuous calculates the predicted time and point of impact in order to initiate release of an airbag at a predetermined time before impact between said object and the side of said vehicle.

16 Claims, 13 Drawing Sheets

RADAR DETECTOR FOR PRE-IMPACT AIRBAG TRIGGERING

BACKGROUND OF THE INVENTION

1. Field of the Invention

This invention relates generally to apparatus and methods for radar impact detectors, and especially to systems which are used to deploy a side air bag in advance of an imminent side vehicle collision.

According to a report by Ludo Careme of the Belgian Insurance Group, side impacts are second in lethality to head-on collisions, accounting for about 30% of the total numbers of serious automobile related injuries in European countries. More than half of all side impacts occur in intersection collisions in which the cars are traveling on paths perpendicular to one another. The most dangerous impacts are those in which the car is struck centrally. When the collision is off-axis, much of the impact energy is transferred into less damaging rotations of the impacted vehicle.

In response to the above dangers, automobile manufacturers are now beginning to install side airbags. One luxury class car maker now advertises that since 33% of all car accidents are side-impacted collisions, they have installed front seat-mounted, side-impact airbags for both driver and passenger in their 1997 model. However, traditional accelerometer or acoustical based switches must wait for impact to initiate, which, because of the proximity of the passenger to the impact area, limits passenger protection capability. The rapid inflation requirement imposed by post-impact initiation also increases the risk of passenger injury due to airbag deployment alone, with many deaths per year now being attributed to airbag deployment in the less strenuous front airbag scenario. Automobile manufacturers are now searching for a predictive triggering system to initiate the inflation of side airbags a minimum of 15 to 20 milliseconds prior to impact.

2. Background Art

Systems and devices for collision avoidance of air, sea, and ground vehicles are in general well known. Early devices utilized forward-looking antennae with radio frequency transmitters and receivers. In U.S. Pat. No. 3,891,966, Sytankay disclosed a laser system designed to avoid rear end collisions between automobiles. This apparatus provides a laser transmitting and receiving system and a detection system mounted on the front and rear of automobiles. The transmitter at the front end emits a signal having a designated wavelength $f_1$ and the receiver at the front end receives signals having a designated wavelength $f_2$. Upon reception of signals of wavelength $f_1$, the modulator at the rear end of a leading car would activate the transmitter which would send a return signal of wavelength $f_2$ to the receiver at the front end of the trailing car. This signal is interpreted by circuits in the receiver and furnishes a warning of the proximity of the vehicles.

Sterzer, et al, in U.S. Pat. No. 4,003,049 shows a frequency-modulated continuous-wave collision avoidance radar responsive to both reply signals from cooperating (tagged) targets and to skin reflections from proximate non-cooperating (non-tagged) targets.

German Patent No. 2,327,186 and U.S. Pat. No. 4,101,888 to Heller, et al, describe a system in which detections are limited to the "electronic road channel" in which the vehicle is traveling. The radar has two antennas which radiate RF signals of different frequencies. The signals received by one of the two antennas are evaluated by determining the difference between the amplitudes of the RF signals reflected from an object. A signal proportional to the difference is then compared to a threshold proportional to a predetermined azimuth range, so that cars moving in the same road lane may by discriminated against other passing objects.

More recent devices employ a millimeter wave antenna capable of electronic scanning. An example is shown in U.S. Pat. No. 5,264,859 to Lee et al, in which a linear ferrite loaded slot array illuminates a dielectric lens. Beam scanning is achieved by controlling a bias magnetic field along the ferrite rod of the slot array. More advanced systems might employ a conformal array disposed within or around car structures such as bumpers. Such antenna systems are generally taught by Speciale in U.S. Pat. No. 5,512,906.

A more complete total avoidance system is discussed by Shaw et al in U.S. Pat. No. 5,314,037. Here, the laser detection system is coupled to both warning and automatic car control devises, such as steering and braking systems, in order to take evasive action. Obviously, such complex systems are expensive to build and will have a lower inherent reliability. Although the above systems may find utility in avoiding front and rear collisions, they are not adapted for early warning of imminent side collisions.

SUMMARY OF THE INVENTION

A bi-static pulsed radar, called the Imminent Side Impact Detector (referred to herein as the "ISID"), has been invented to address the above requirements. The concept is adaptable to any frequency from about 900 MHz to 24 GHz. Lower frequencies have advantages in cost and in reduced susceptibility to false alarms from non-threatening objects such as tumbleweeds, however, lower frequencies require larger antennae to obtain a controlled vertical beamwidth. Equipment and cost may also limit the upper end of the desirable frequency spectrum to upper X-band. Current Federal Communications Commission regulations allow several possible bands for unlicensed operations. Although the above systems may find utility in avoiding front and rear collisions, they are not adapted for early warning of imminent side collisions.

The prime embodiment of the ISID consists of two functionally identical transmitter and receiver pairs under the control of a microprocessor. One set is mounted on each side of the vehicle in such a way as to guarantee coverage of the protected area. The protected area would include the passenger compartment as a minimum, but could extend beyond the wheel wells if deemed necessary from a passenger safety standpoint. The transmitting antenna is mounted at the aft limit of the protected area, either incorporated in a non-metallic body panel, or in a radome covered cutout on the pillar exterior or other metallic body panel. The receiving antenna is mounted at the forward limit of the passenger compartment in a similar manner.

The ISID is controlled by its own microprocessor, but it will be recognized that the control functions may be integrated with the vehicular restraint system electronics. Communications with the automobile's central processor is over a serial I/O bus. EEPROM is included in the configuration in order to readily support self-test and diagnostics. The transmitted pulse, on the order of 10 mw peak output power, is reflected from the approaching object to the receiving antenna. The received signal is detected and compared to a software controlled threshold, providing both radar cross-section discrimination and range information. When the leading edge of the received signal amplitude exceeds the threshold, the timing ramp integrator input is disabled. The voltage at the output of the timing ramp, which is proportional to the bi-static range from the transmitter to the object and back to the receiver, is sampled by an ADC and read by the processor. The processor resets the timing ramp integrator and processes the range data to estimate bistatic range, apparent velocity, and apparent acceleration. By characterizing the apparent acceleration and velocity versus bi-static range profiles, a parameter map is built which can be used to discriminate between impact and near miss scenarios. When collision is imminent, the processor predicts impact time and triggers the side airbag inflation at the appropriate instant to allow inflation before impact. Such early inflation guarantees that the airbag will be functional at the time the impact occurs, thereby dramatically increasing passenger safety.

There are many cases in which an object approaches or impacts the side of a vehicle in which it is inappropriate to trigger a side air bag. For instance, it would definitely be inappropriate to trigger on a baseball, cardboard box, or a tumbleweed. These objects have little or no radar signature at the frequencies involved and pose little threat at reasonable approach velocities. The use of relatively low frequency radar for the ISID gives it false alarm immunity advantages in this bi-static approach that could not be obtained if a laser or light emitting diode ranging system were employed. On the other hand, relatively low speed impacts of 30 mph or less from a heavy truck or speeding sedan would definitely call for bag deployment. These threats have relatively large radar signatures at the longest ISID ranges. The need for amplitude discrimination arises in those cases where the target characteristics and approach speed, location, and angle call for a conditional decision. The approach profile is tracked for all threatening approaches. The degree of threat from an approaching object, given the approach profile is equivalent, is generally proportional to the radar cross-section of the objection. Since the range is tracked from the threshold crossing of the return signal, there is no direct measurement of return signal amplitude which is directly related to radar cross-section of the target.

Two readily available methods for obtaining this threat amplitude information may be used in this design. The first involves momentarily disturbing the target track at non-critical ranges, say 18 or 19 feet bi-static range, and varying the gain and/or threshold to assess a peak amplitude. The preferred method does not disturb the target track, and comes as by-product of a method of velocity estimation. At the time of the leading edge of the target return, there are two signals being received. One is the target signal, and the other is the direct path spillover signal from the transmit antenna to the receive antenna. These two signals sum constructively or destructively depending upon the relative phase of the signals. The result is that the direct path signal will modulate the threshold crossing times of the target signal with a period equivalent to the time it takes for the target to close one wavelength in bistatic range. This interaction is normally considered a nuisance, but with management of the isolation between the two antennas using beam pattern and polarization control in the antenna design, this interaction is used to advantage. The degree to which the threshold crossing is modulated depends upon the relative strengths of the two signals. Processing this modulation using standard image processing techniques to determine its period provides a direct velocity estimate. As a by-product of this processing, the depth of modulation is collected and used for target amplitude discrimination, with the depth of modulation inversely proportional to target radar cross-section.

Although the system described above is categorized as a pulse radar, other embodiments may be configured as a CW doppler, or a Pulse doppler system, which provide a direct measurement of velocity. Other configurations could use laser diodes or high intensity light emitting diodes instead of a radar transmitter, and photodiodes instead of a radar receiver. The light emitting systems lack the centroidal radar cross-section discrimination capability, and the ability to use the interaction between spillover and target reflected signal for velocity estimation. Some degree of target size estimation could be achieved by limiting the transmit pulse width to only a few nanoseconds, two to four, and providing a second timing ramp integrator which would measure the time until the first threshold exceedance goes back low again. The difference between the two measured times provides a crude estimate of target physical cross-section for use as a threat discriminator.

The prime object of this invention is to provide a radar predictive triggering system which will permit the inflation of side airbags prior to an imminent vehicle side collision.

It is another object of this invention to provide a bistatic radar system which will provide a minimum of 15 milliseconds for airbag initiation before impact.

It is an additional object of this invention to provide a bistatic radar impact detector for airbag triggering which will discriminate against high speed near misses encountered in normal traffic conditions.

It is a further object of the present invention to provide a bistatic radar impact detector for airbag triggering which will discriminate against non-threatening closing objects such as windblown cardboard boxes or tumbleweeds.

It is an additional object of the present invention to provide radar impact detector for airbag triggering which will have a self-diagnostic capability.

It is a another object of the present invention to provide a bistatic radar impact detector for airbag triggering which will operate with a low false alarm rate in a metropolitan electromagnetic environment, and will not appreciably increase that environment by producing electromagnetic interference.

It is yet another object of this invention to provide apparatus for radar impact detector for airbag triggering in which false alarms are essentially non-existent.

It is still another object of this invention to provide a bistatic radar impact detector for airbag triggering which is inexpensively manufactured, is structurally rigid and safe, and will have reliable long life.

BRIEF DESCRIPTION OF THE DRAWINGS

FIG. 3b depicts the additional blocks necessary to provide pulse doppler capability to the block diagram of FIG. 3a;

DETAILED DESCRIPTION OF THE PREFERRED EMBODIMENTS

The preferred embodiment of this system utilizes a bistatic radar, wherein the receiver is physically displaced from the transmitter. It is well known that for the bistatic radar case for a given target size, where all other systems parameters such as transmitter power, frequency, antenna gains, and systems losses are held constant, the radar range equation is approximated by $Pr=k/(Rt)^2(Rr)^2$, where $Pr$=power received out of the receiving antenna, $Rt$=range from target to the transmitting antenna, and $Rr$=range from the target to the receiving antenna. For a target proceeding orthogonally toward the midpoint of a fixed base line connecting the two antennae, $Rt=Rr=R$, and the bistatic range equation reduces to the $k/R^4$ relationship of a monostatic radar.

Figure 1:
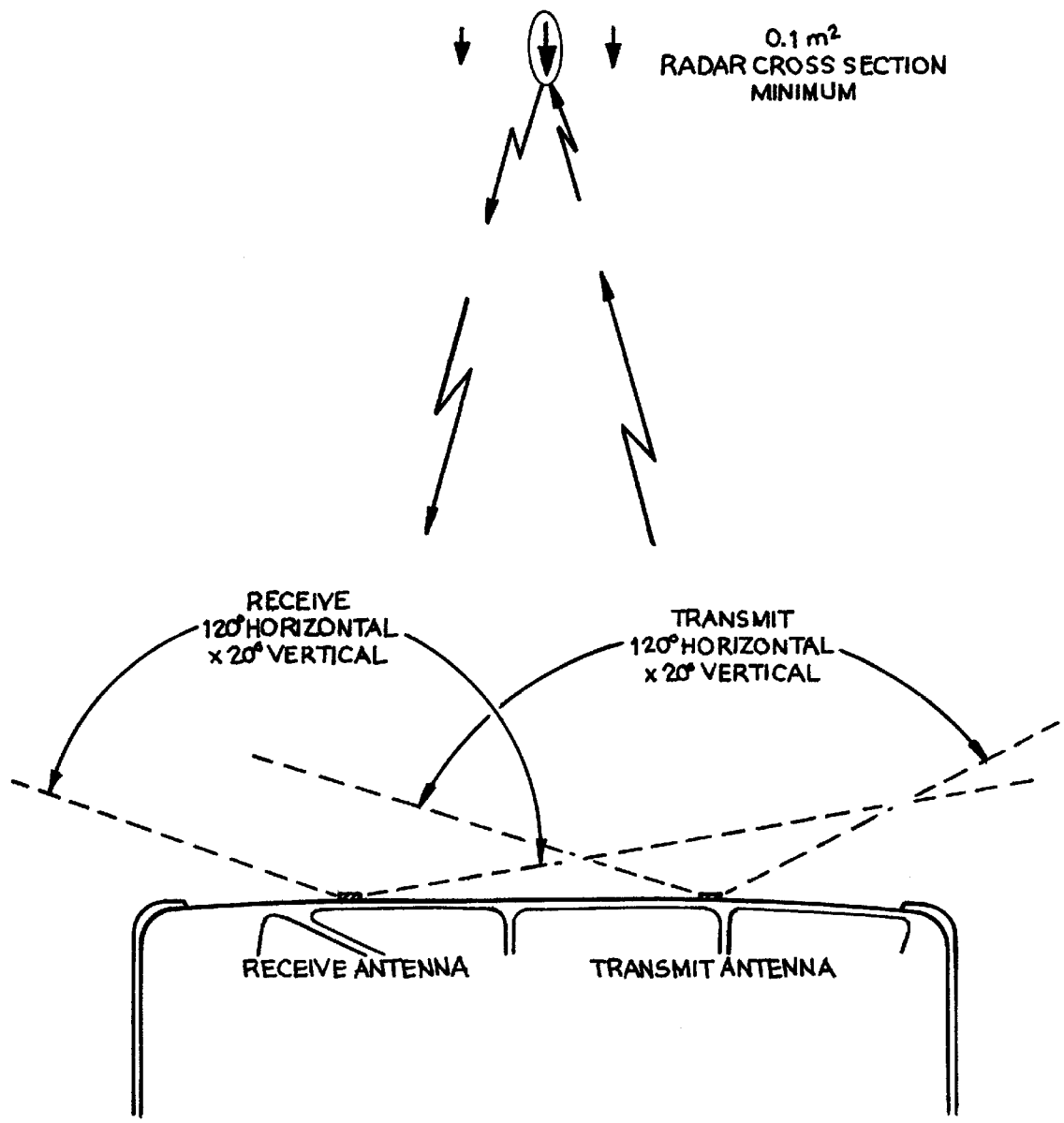
FIG. 1 depicts a plan view of the geometry of an imminent normal side engagement, including the parameters of a radar system designed to detect a given minimum sized target.

FIG. 1 shows a plan view of the geometry of the above special case, and includes the parameters of a particular radar system design. In this example, a 5.8 GHz system is configured against a threatening motorcycle target having an assumed minimum radar cross-section of 0.1 square meters. The transmit module radiates approximately 10 mw of power from a transmit antenna about 6 inches high by 1 inches wide, mounted in a rearward door pillar of a passenger compartment, and having a 20 degree vertical beam width and a 120 degree horizontal beamwidth. A similarly sized receive antenna is mounted in a forward door pillar, Each antenna has a 10.5 db gain. Mounting of the antennae is controlled so as to provide a desired maximum level of direct radiation spillover path between the each transmitting antenna and its associated receiving antenna.

Figure 2:
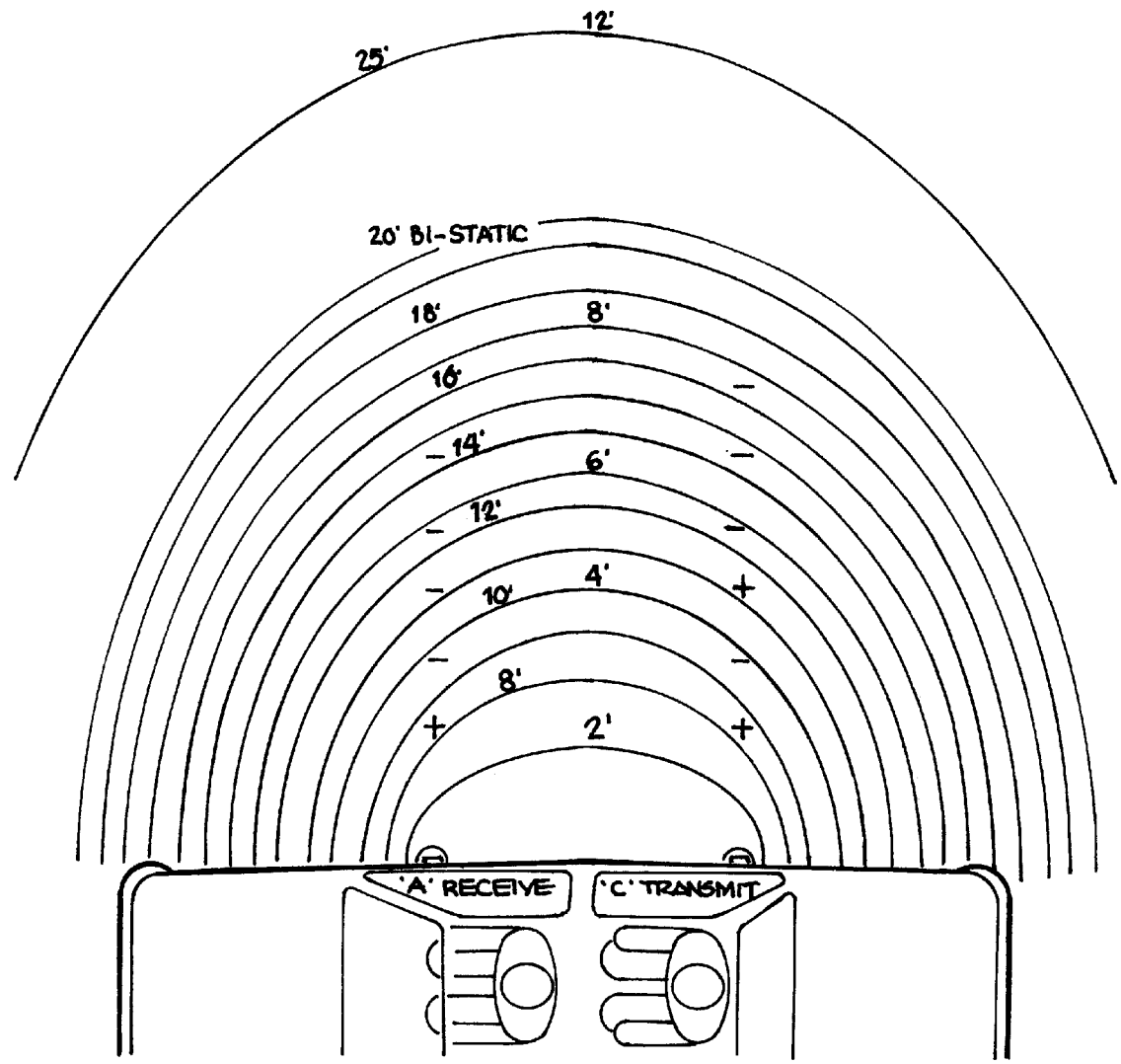
FIG. 2 shows a plan view of the antennae patterns adjacent to the passenger compartment for the same parameters of the system of FIG. 1.

FIG. 2 shows a plan view of the antenna pattern adjacent the passenger compartment, showing complete coverage of that compartment. At 12.5 feet away from the center of the vehicle, the minimum power level out of the receive antenna is about −63 dbm. Even with a receiver bandwidth of 500 MHz, this is equivalent to a receiver noise figure of no greater than 24 db. Allowing for another 10 to 12 db of sensitivity to permit detection of a direct path signal above the noise floor requires a receiver noise figure of no worse than 12 db. This is easily achievable with low cost available components.

Figure 3A:
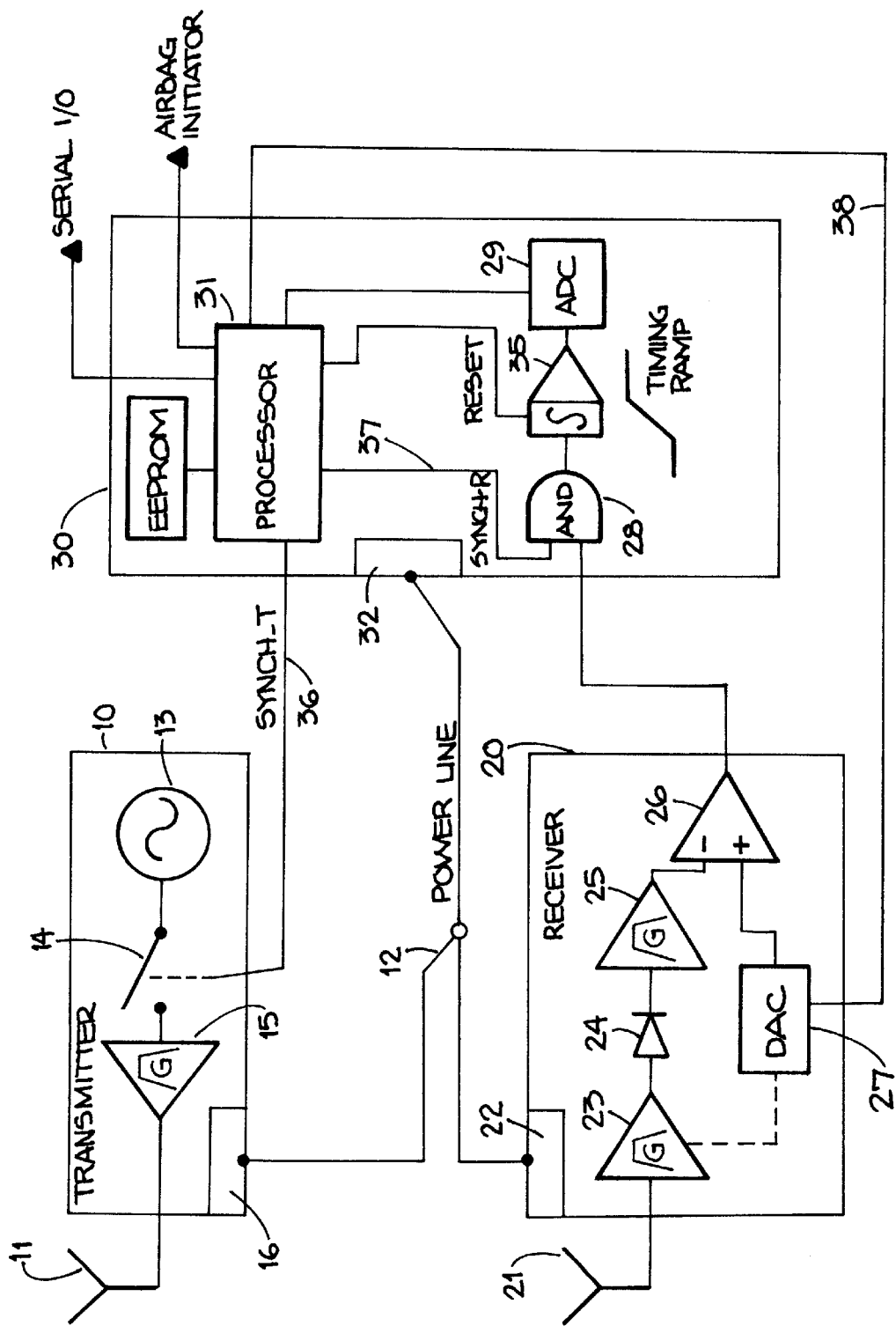
FIG. 3a presents a block diagram of a preferred embodiment of my invention.

FIG. 3 presents a block diagram of a preferred embodiment of my invention. Both left and right sides of the system are functionally identical and independent. Each side of the triggering system is comprised of a transmit module 10 connected to the transmit antenna 11, and a receiver module 20 connected to the receive antenna 21. The RF signal is bandpassed filtered and amplified by approximately 40 db in amplifier 23. A minimum signal level of −23 dbm is provided to the detector block 24 for detection, amplification and low-pass filtering 25, and transmission to the processor 30. Each module receives its power from the vehicle's start/run power line. The transmitter module 10 and the timing ramp integrator 35 are synchronized electrically by a twisted-pair SYNCH-T pulse line 36 originating in the processor module 30.

In operation, the processor initiates two SYNCH pulses, a SYNCH-R pulse on line 37, which is used as an input to the timing ramp integrator 35, and a SYNCH-T pulse on line 36 which enables the transmit pulse in the transmitter module. As the timing function uses the leading edge of the return, the SYNCH-T pulse width is not critical. It is chosen to optimize compliance with transmit bandwidth and average radiated power regulatory requirements for the frequency of operation. Reasonable pulse widths range from a few nanoseconds to a few microseconds. A 40 nanosecond pulse width is chosen to provide a relatively narrow transmit bandwidth and to provide enough average radiated power to make diagnostics with low cost spectrum analyzers feasible.

The transmit module 10 uses low cost MIMIC technology. This module consists of a power conditioning section 16, an RF oscillator 13, and an amplifier 15 and FET switch 14 which interface with the transmit antenna 11. The SYNCH_T pulse closes FET switch 14 with a rise time less than 2.5 nanoseconds, which momentarily connects the transmitter's output to the transmit antenna 11. The transmit module is physically mounted in close proximity to the transmit antenna to simplify the transfer of the approximately 10 mw of output power required.

The receiver module 20 is in close proximity to the receive antenna 21. Power is received from the vehicle's run/start power line and further conditioned inside the module by power conditioner 22. A receiver section, which is a produced as a simple Application Specific Integrated Circuit (ASIC), conditions and processes the RF power from the receive antenna 21. Minimum target returns of interest are expected to be greater than −70 dbm. As previously mentioned, antenna mounting design is adjustable such that antenna to antenna spillover leakage delivers a direct path signal to the receiver above the receiver noise floor, but at least 6 to 10 db lower than the minimum return of interest. Detection of this very low level direct path signal allows self-zeroing of the ISID timing/ranging function. The direct path signal will sum with the target signal when it arrives. Therefore, the direct spillover signal strength must be kept to 3 to 10 db lower than the lowest target return of interest in order to utilize desired target signal strength fluctuations as the two signals move in and out of phase without causing loss of target detection.

The receiver analog ASIC contains a 30 to 50 db gain and filtering stage 23 prior to a detector block 24. For an implementation with limited video section dynamic range, rf gain adjust is included in the receiver implementation. The bandwidth of the receiver rf section is approximately 500 MHz to provide quick signal rise times on the order of 2 nanoseconds or less. If an RF frequency of less than 2 GHz is chosen, a full wave rectifier detector 24 may be used to increase leading edge resolution. Following the detector block 24 is a gain stage 25 with bandpass filtering to condition the signal for interfacing with the thresholding comparator 26. The low end of the bandpass is on the order of 10 to 30 MHz to minimize noise and interference from undesired signals in the band. The upper end of the band pass is chosen to provide a rise time on the order of a couple of nanoseconds, approximately 175 MHz. An optional feature of the detector circuit is an automatic bias voltage in a manner that the sum of the DC current and the amplified background RF current through the detector diode are set to maintain an impedance match into the detector diode. Another related option is to feed the value of the adjusted bias voltage to the processor as an indication of the RF background level for making state of health and electromagnetic interference related decisions.

The processor section 30 contains the integrator and microcontroller capabilities of the ISID. The thresholding comparator 26 in the receiver output goes low when the detected voltage exceeds the software controlled threshold voltage from a DAC 27 in the receiver. The comparator output is ANDed with the SYNCH_R pulse line 37 as an input to the timing circuit 28. When the SYNCH_R pulse line 37 goes high, and the comparator 26 output is still high, the output of the AND gate is integrated in the timing ramp generator 28. The timing ramp generator slews at a rate on the order of 0.1 V/nsec until the comparator output goes low, switching off its input. The final timing ramp output voltage, which is proportional to the bi-static range, is the input to ADC 29 in the digital section. After the sampling and conversion have been completed, the timing ramp integrator is RESET by a control line from the digital section.

Also contained within the processor section 30 are the microprocessor block 31, including but not shown, are conventional clocks, RAM/ROM memory, interface control-blocks to the 8-bit ADC section, and an interface 38 to the 8-bit DAC section 27 of the receiver and an EEPROM section. The processor section also contains a serial I/O port 33 for communication with the vehicle's computer system and with diagnostic equipment. Pertinent diagnostic information, stored in the EEPROM section, is accessible through this port. The processor section also contains conventional bus and control lines for interface with the ADC and DAC sections, as well as the SYNCH pulse outputs to the integrator section and the transmitter module. The processor section's output 34 to the airbag initiator may be either one control line or two control lines with opposite protocols for added false trigger glitch protection. Self-diagnostics are conducted at power up and periodically thereafter. Status information is available for outputing to the vehicle's computer system as required. Prior to the start of a transmit pulse cycle, a RESET signal is pulsed to the integrator section to zero out the timing ramp generator in preparation for the upcoming processing. An appropriate value is also set in DAC 27 and used for setting the comparator threshold and optionally the rf gain, of the receiver section. A SYNCH_T pulse is set high for a short time to enable the transmit pulse and the SYNCH_R is set high to enable the timing ramp generator 28. Approximately 50 nanoseconds after the SYNCH pulses go high, plus integrator settling time, the conversion process is initiated in the ADC. The ADC output is read and processed by the embedded software, leading to either continued processing, a fault message, or an airbag initiation as appropriate.

Figure 4A:
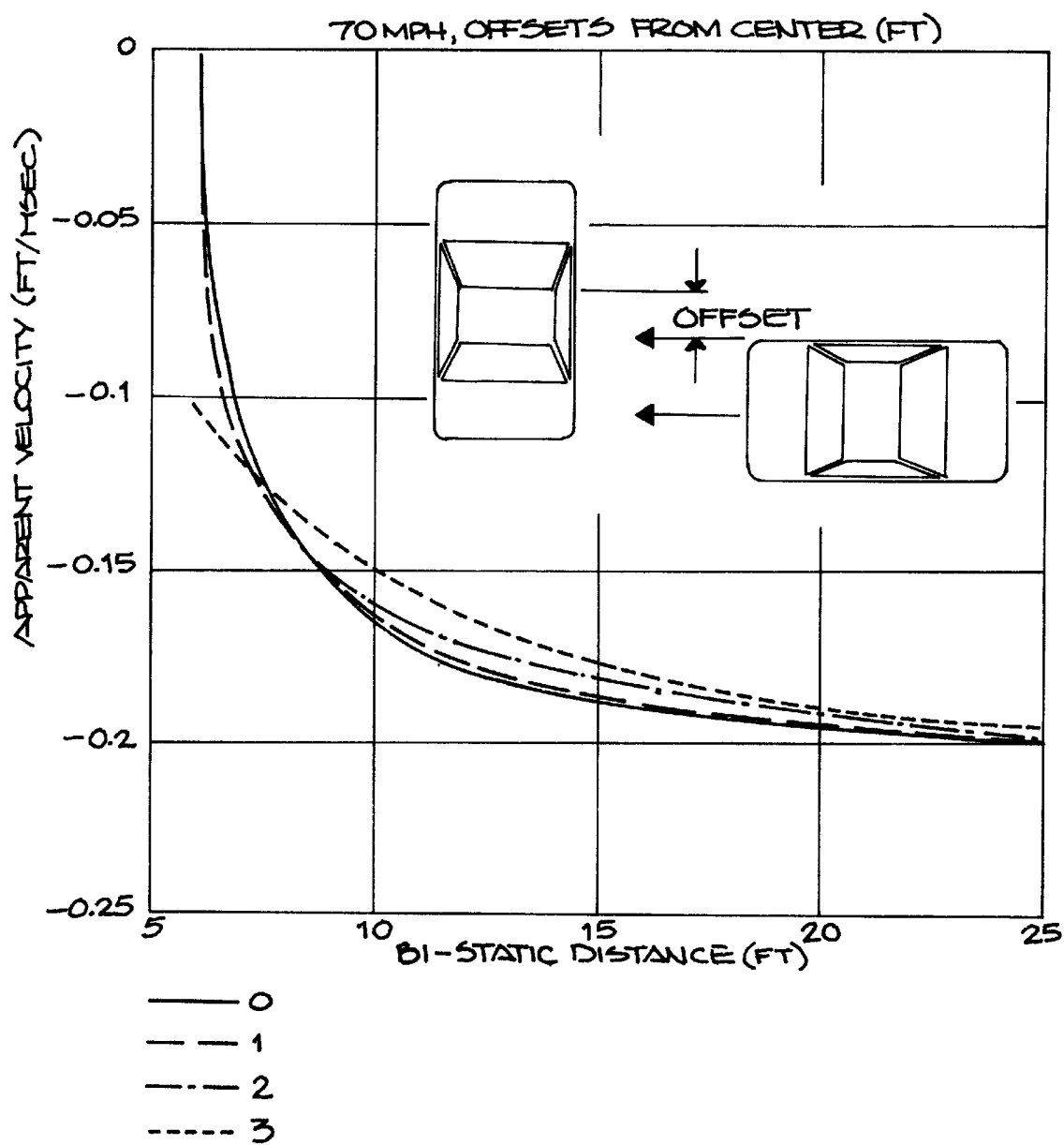
FIG. 4a is a plot of apparent velocities vs. bi-static distance profiles for an target impact offset from the centered normal target impact.
Figure 4B:
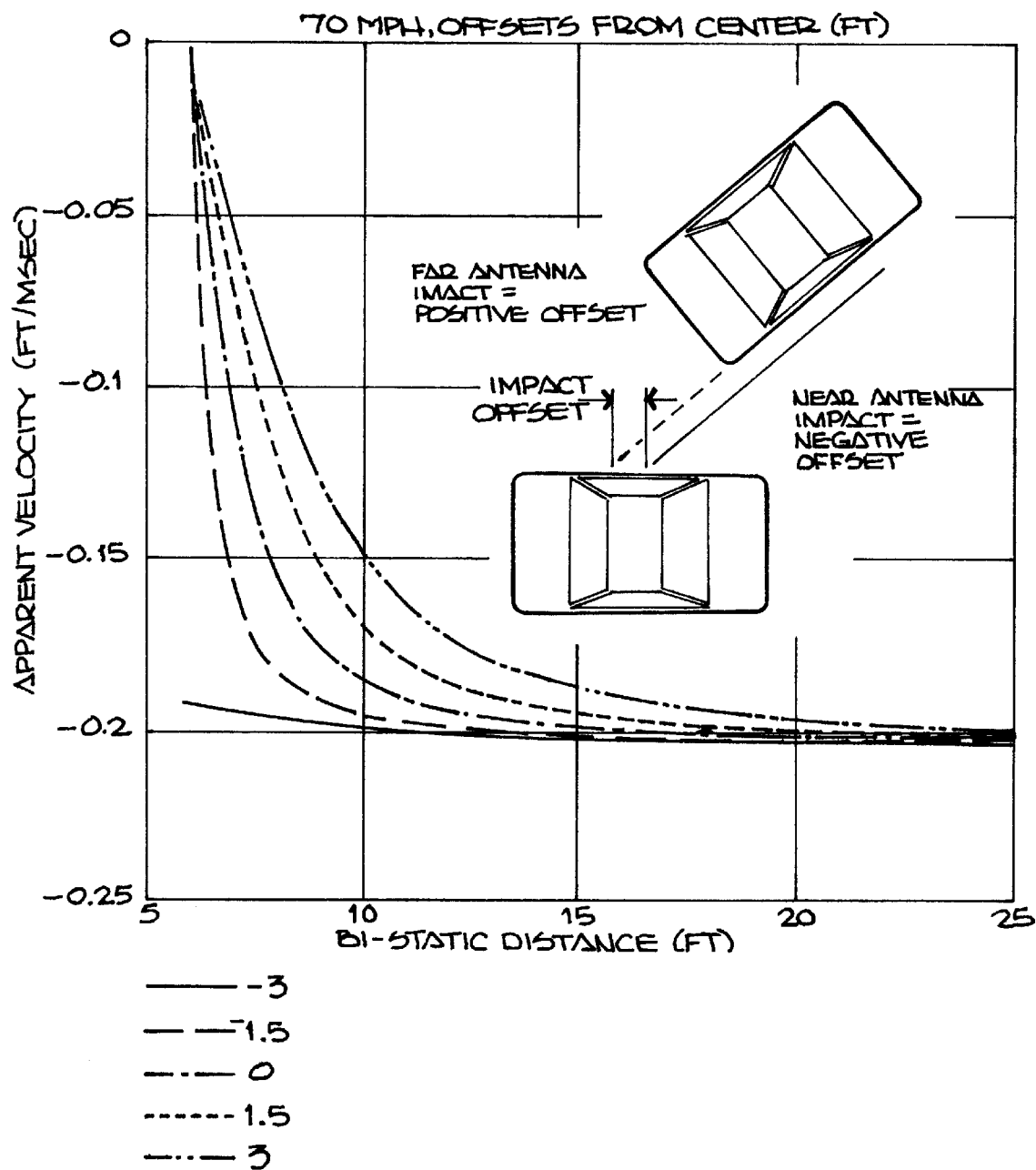
FIG. 4b presents a plot of apparent velocities vs. bi-static range profiles for a 30 degree trajectory offset toward the far antenna.
Figure 4C:
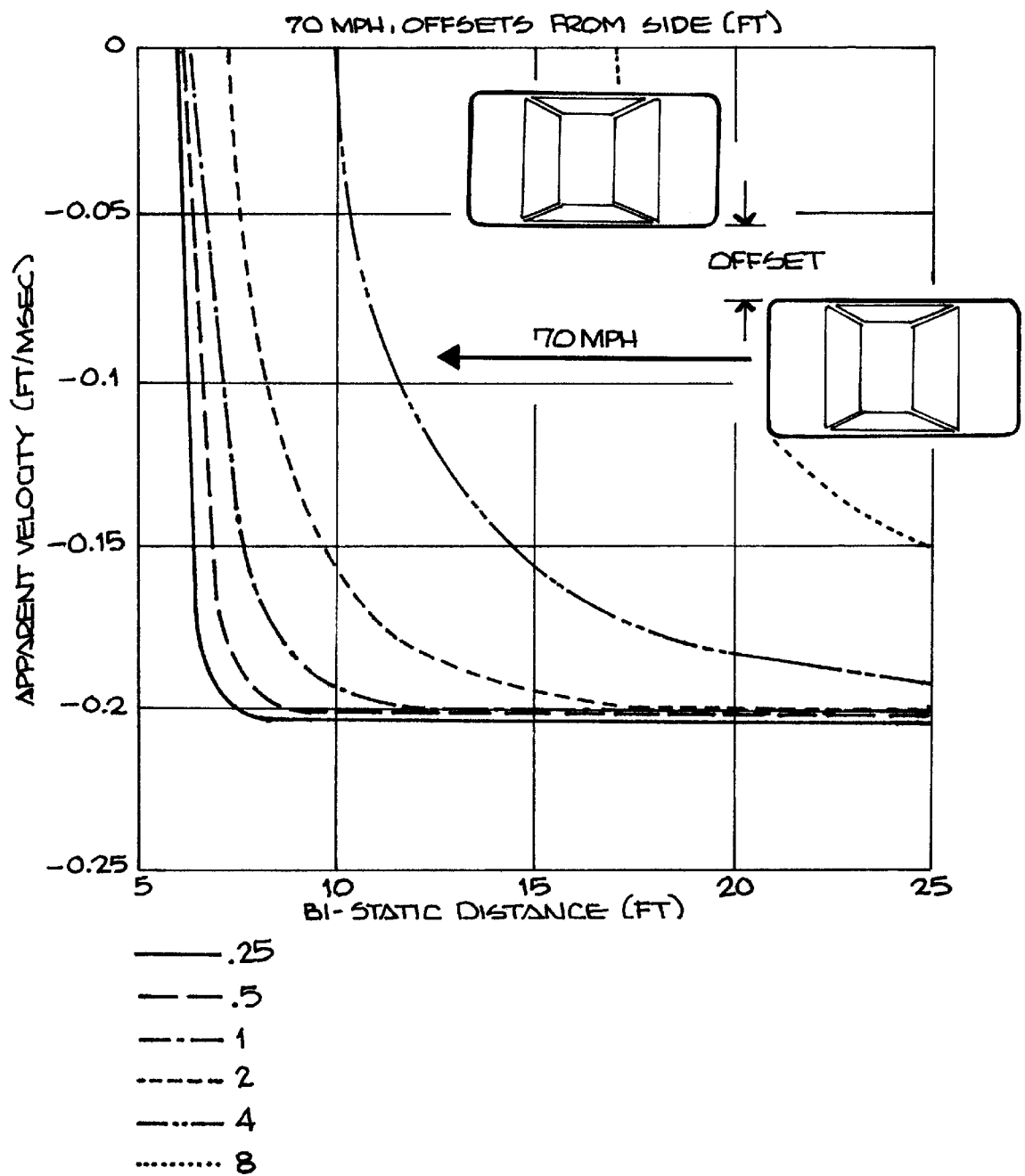
FIG. 4c is a plot of apparent velocities vs. bi-static range profiles for an offset parallel target trajectory.

The key to successful discrimination against near misses is accurate prediction of impact location and time. This system achieves this result by taking advantage of the special properties of the range ellipses in a bi-static radar configuration as they impact apparent velocities and accelerations. By characterizing the apparent acceleration and velocity versus bi-static range profiles, a parameter map is built which can be used to discriminate between impact and near miss scenarios. Input to the prediction calculations include determinations of velocity vs. bistatic distances as are shown in FIG. 4a, in which a perpendicular offset impact geometry is shown. FIG. 4b presents the mapping of velocity vs. bistatic distance for the case a 30 degree off normal approach in which the impact will be toward the far antenna. For comparison purposes, FIG. 4c shows the velocity vs. bistatic distance for a parallel target approach with a safe offset distance.

Figure 5A:
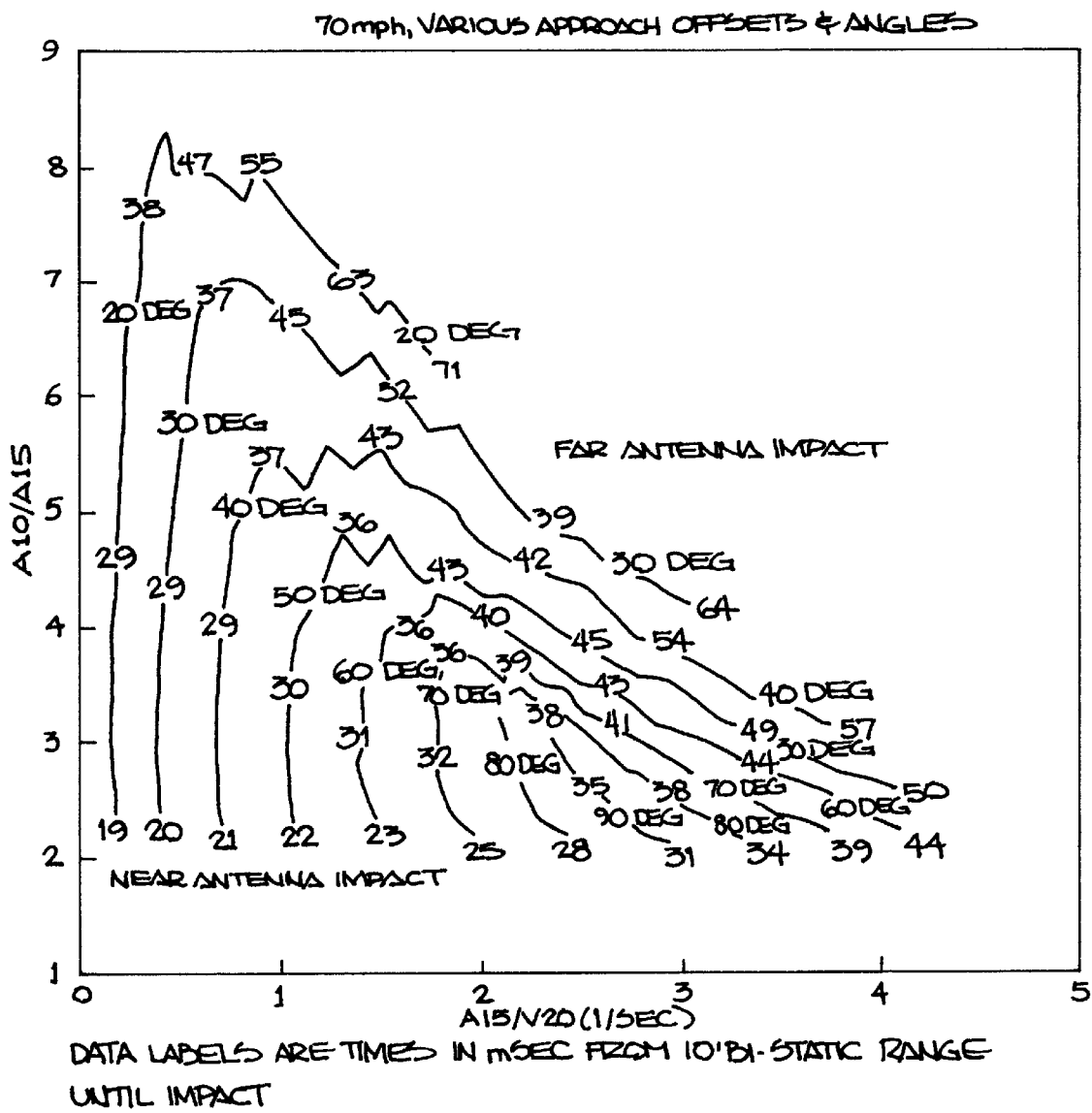
FIG. 5a presents an approach profile map of approach angle, impact offset, and impact time.
Figure 5B:
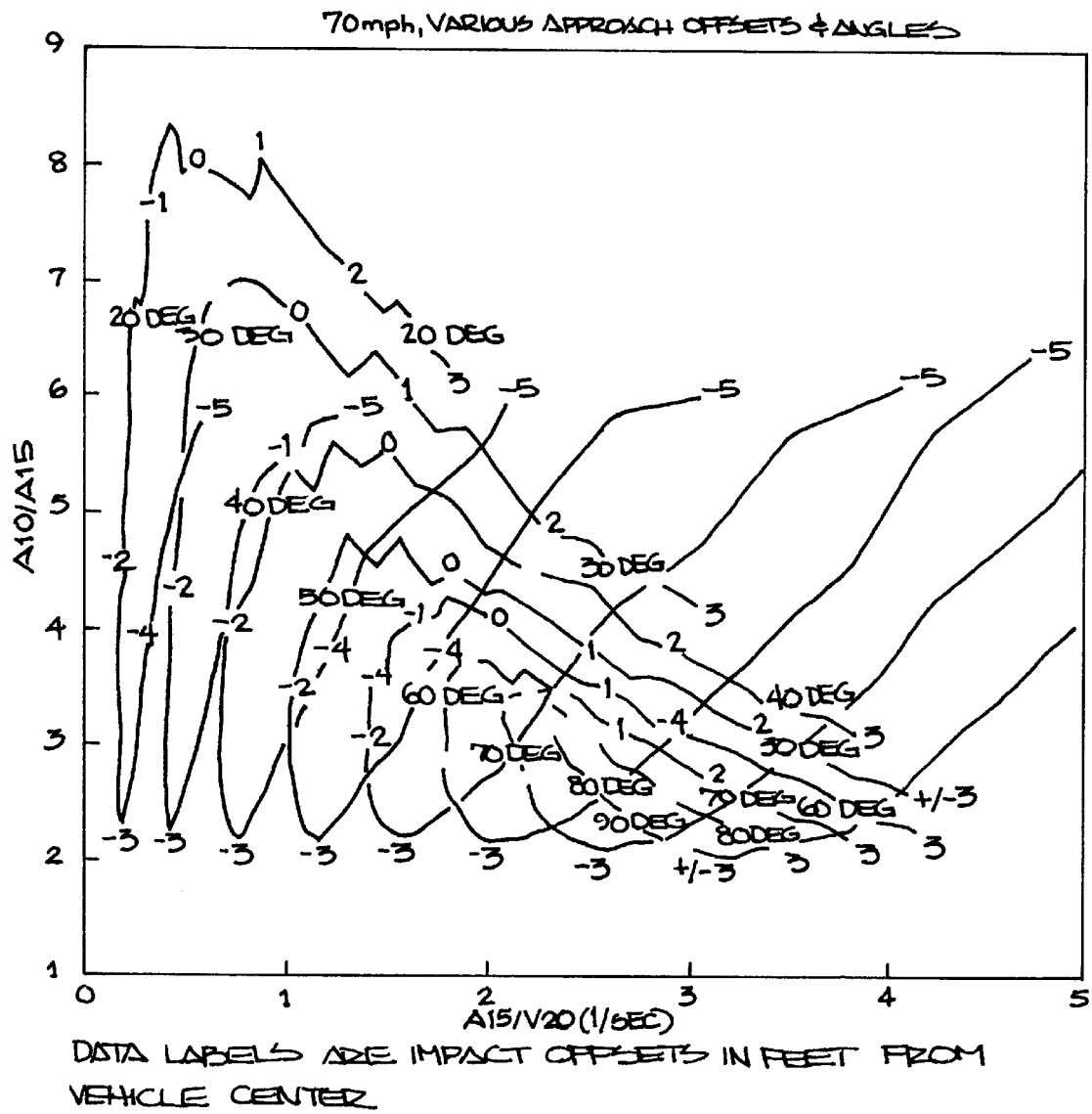
FIG. 5b presents an approach profile map showing near impact ambiguities.

By tracking a closing target from far to close ranges, a parameter map can be utilized for the side airbag triggering decision process. For example, a track is established on a closing object when the object is outside a 20 foot bi-static range ellipse. Target apparent velocity is tagged when it crosses the 20 foot range. As the target closes within a bistatic range of 15 feet, its apparent acceleration is tagged for reference. Amplitude discrimination is attained by either varying the threshold and gain at non-critical times, or by processing the degree to which the summing of the target return and the antenna-to-antenna direct path signal modulates the threshold crossing times. As the target closes within a bistatic range of 10 feet, apparent acceleration is estimated again. Using the mapping portrayed in FIG. 5a, the approach angle, impact offset, and impact time can be determined to feed a triggering decision. Apparent velocities and accelerations can be computed by differentiating the range estimates, but this process is hampered by noise and the interaction between the target return and the direct path spillover signal. Two other methods are used for estimating apparent velocity which rely upon range returns filtered digitally using a median filter followed by a low pass filter. For strong signals, less affected by the direct path signal interaction, velocity is estimated by calculating the number of samples between estimated range closure crossings of successive range bins, for example, 2.5 foot bins from 20 to 17.5 feet, 17.5 to 15 feet, etc. For smaller signals, more affected by direct path spillover signal interaction, the second method is effective. The range measurements are filtered using digital signal processing techniques such as a "peak" or "pulse" detecting filter, which possesses an output that will track the range estimate modulation with a period equivalent to the time required to close one wavelength of bistatic range. The apparent velocity is estimated by calculating the number of samples in the period of this filter output. Updates to this estimate are obtained using the number of samples between the successive maxima, minima, positive-going zero crossings, and negative-going zero crossings of the filter outputs, providing four updates per period. The amplitude of this filters output is inversely proportional to the relative signal strengths of the target return and the direct path signal strength. This parameter provides the capability for radar cross-section threat discrimination. Apparent acceleration is estimated by comparing apparent velocity estimates at differing ranges. This process can provide accurate impact prediction for any impact within the protected zone lying between the transmit and receive antennae. For collision approaches leading to impact outside of the protected zone, some limited protection will be provided. For impacts that fall outside of the far antenna, the parameter table can be extended to give some protection within for about another two feet if necessary. For impacts which occur up to two feet prior to the near antenna, it is sometimes possible to trigger airbag initiation. However, because of ambiguities in the mapping depicted in FIG. 5b, the trigger time may be a few milliseconds later.

Figure 6A:
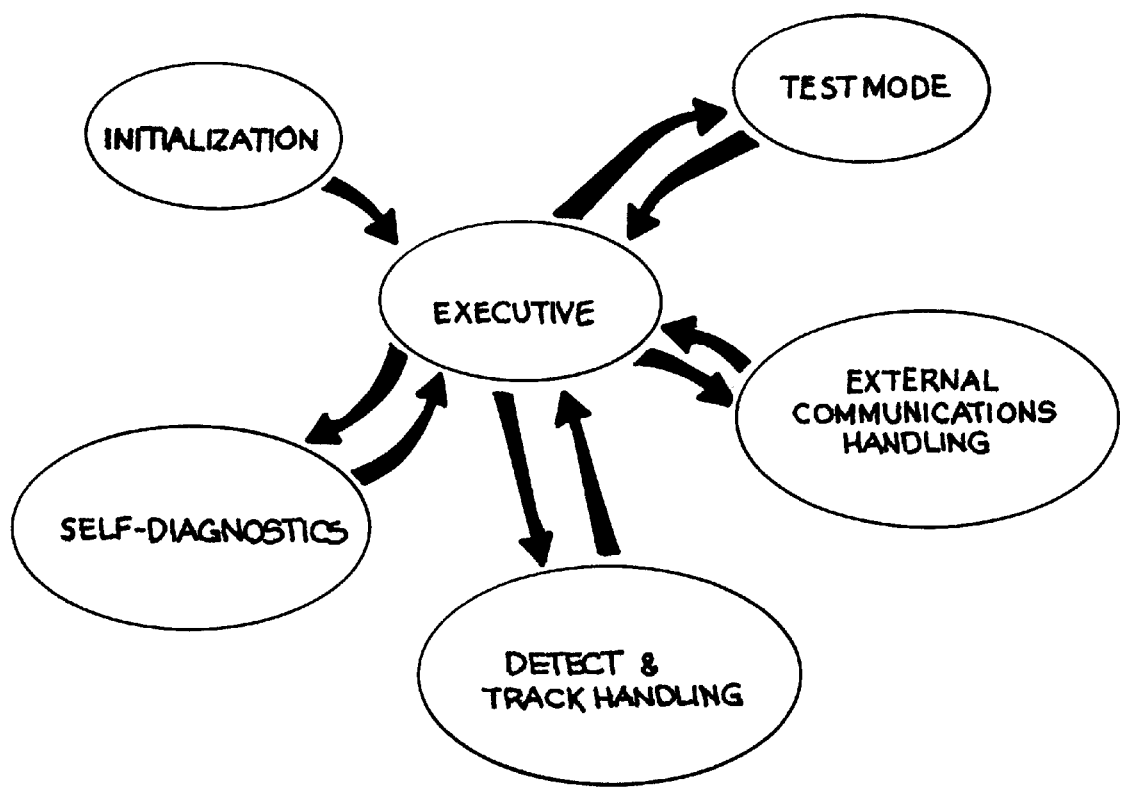
FIG. 6a depicts the operational states of the system.

The system operates in several operational states, as indicated in FIG.6a At power on, an initialization process would lead to a program executive process which would control the transition to and from the other states. At start-up and periodically thereafter, the self-diagnostics processes would be executed. The self-diagnostics would include calibration and health checks, such as checking for radar range data indicating ground reflections or returns from a closer object. For implementations with rf gain adjust capability, health checks can include monitoring the noise floor level as rf gain is adjusted to ensure that the rf noise floor is above the video noise floor for sensitivity verification. Self-calibration of the integrator output is accomplished through comparing the results under known duration "long pulse" and "short pulse" SYNCH_R conditions with the SYNCH_T pulse disabled. This provides a calibration of the counts per nanosecond out of the integrator and ADC. One nanosecond is very nearly equivalent to one foot of range for the radar wave in free space. Zeroing of the timing function is accomplished by setting the gain high enough and the detection threshold low enough to detect the direct path signal with the transmitter enabled. The count out of the ADC indicates a bi-static range equal to the distance between the two antennas. Part of this process would entail reading and storing diagnostic data in the system EEPROM. The External Communications Handling processes control communications with the vehicles computer, with the airbag trigger, and with special test and diagnostic equipment. When Test Mode is invoked through the external interfaces, the diagnostic data in the EEPROM would be available for system calibration and troubleshooting.

Figure 6B:
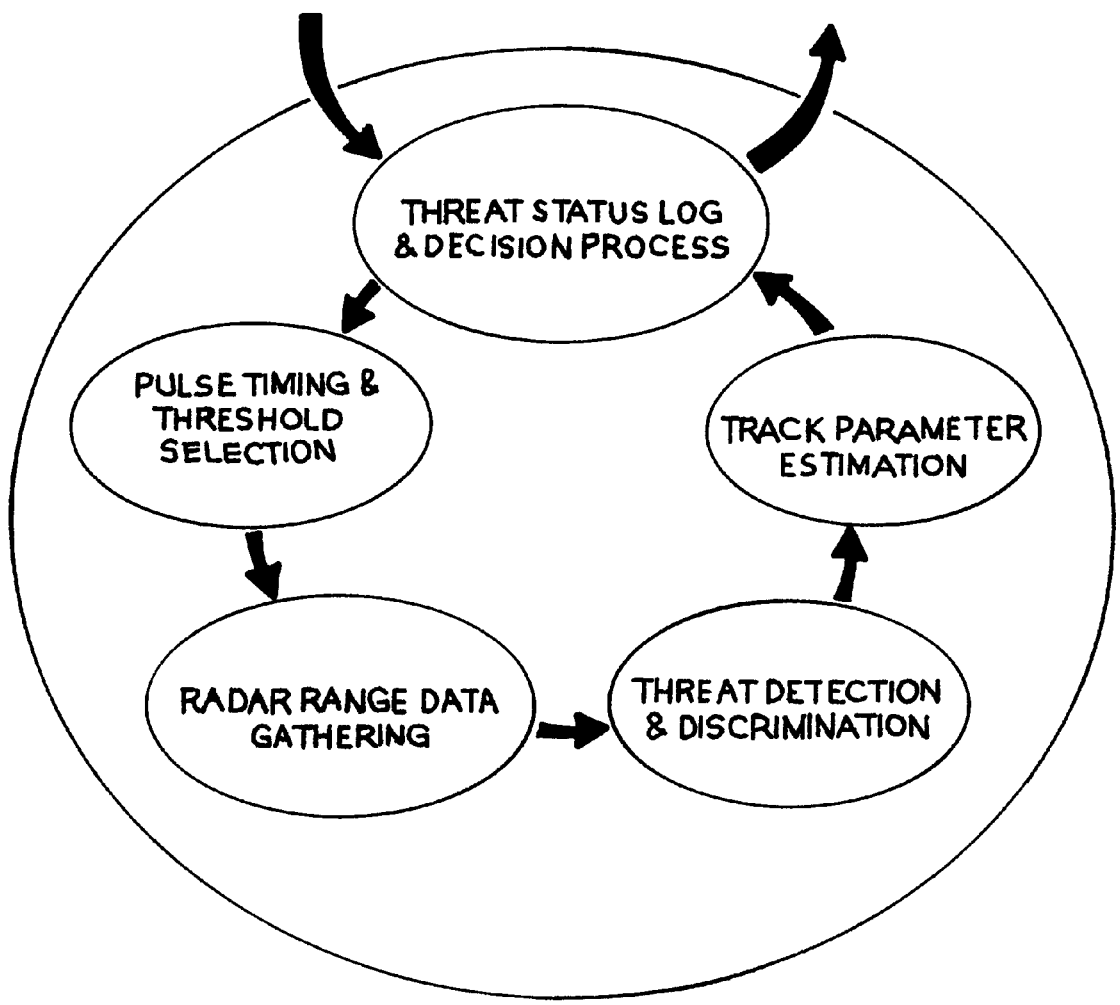
FIG. 6b presents an flow chart of the detection and tracking processes.

Referring to FIG. 6b, the primary functional mode of the system is Detect And Track Handling. This mode controls the key operational processes. A status log is maintained which guides the decision process. Pulse timing and repetition rate are impacted by EMI considerations, threat status, and track parameter ambiguities. Comparator threshold selection will also vary in different situations. If no threat is currently detected, the threshold would be set just above the direct path signal level for maximum sensitivity. Optionally, the antenna pattern can be configured so that ground returns beyond the 25' bistatic range are occasionally detected to ensure a continuous health check and that any threat entering the zone of interest is detected. If an object is detected in the zone of interest, but is not closing quickly, the threshold can alternate up and down to track the detected object and alternately provide peak amplitude estimates for discrimination or to possibly detect larger threats more distant. Radar Range Data Gathering process controls the radar pulse synchronization and analog to digital conversion of the timing ramp integrator output voltage. The ADC output is fed to the Threat Detection & Discrimination process where it, along with previous readings, is used to detect and classify potential threats. For instance, a threat which is first detected at ranges under 20' has probably entered the field of regard from a near parallel path and is not considered a side impact threat. Any potential threats are tracked in the Track Parameter Estimation process using digital filtering image processing techniques and appropriate statistical estimators of the important track parameters. Control is then returned to the Threat Status Log & Decision Process for triggering or return to the Executive processes when invoked.

As was mentioned earlier, a second embodiment may include a direct measurement of velocity by means of using a pulse doppler radar. Little extra hardware is required for traditional pulsed Doppler processing. The two mixing frequencies are already present, as the target return signal sums with the direct path signal from the transmit antenna at the receive antenna. The detector, a non-linear device, mixes the two signals, producing a beat frequency proportional to the apparent velocity of the target and the transmitted frequency.

Figure 3B:
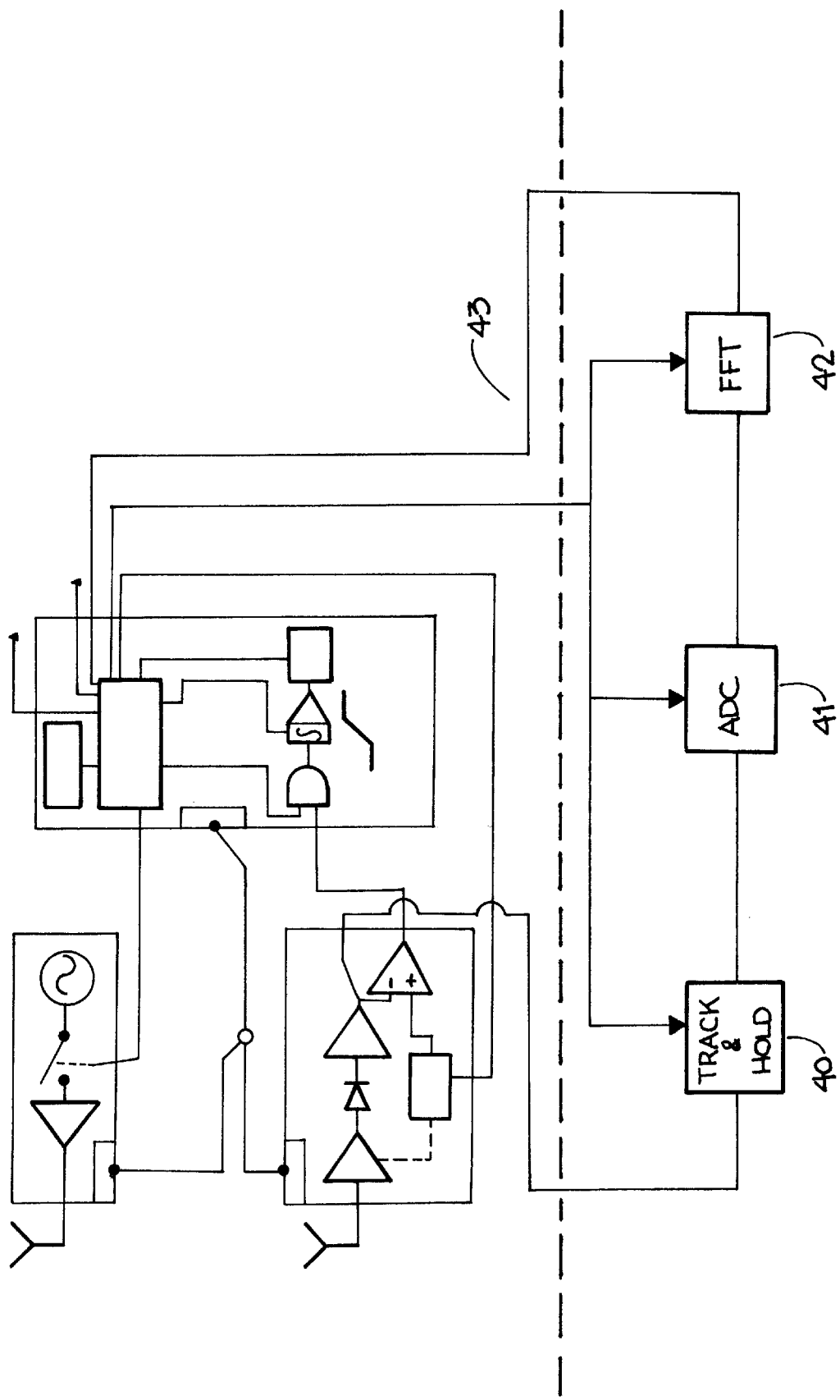

Processing of this information requires additional hardware blocks, which may be seen in FIG. 3b. These additional elements are the Track & Hold block (40) which allows sampling of the detected signal at the estimated target range, another Analog to Digital Converter (ADC) block 41, and a Fast Fourier Transform (FFT) block (42) for spectral analysis of the sampled data. Timing and control of these functions, and data transfer to the processor is through the additional control and data lines (43). A higher sample rate allows the spectral analysis to be conducted at all range intervals of interest.

In the case of lane changing, the ISID aids the driver by providing an audio and/or visual warning of vehicles in the adjacent lane during a lane change operation. The ISID would be provided with a signal from the "blinker" indicating a left or right lane change. The ISID would then return a warning signal, and optionally a range indication, whenever an object was detected within a specified range indicating an adjacent lane or whenever an object was closing with the ISID within a greater specified range. This system can be further enhanced by providing another ISID receiver, and/or ISID receiver/transmitter pair, with antenna beams oriented more toward the adjacent lane to the rear of the vehicle could also be added. Near the corners of the vehicle, antenna beam coverage from a conformal antenna embodiment will be enhanced by using electronically scanning to achieve greater receiver sensitivity in the longer range rear-looking sectors. Also, multiplexing two or more receive antennas to the same receiver module to achieve the desired angular and signal strength sensitivity may be done. The fusion of the information from both receivers could enhance use as a lane change driver's aid by minimizing the ambiguities about which lane an object is in, the adjacent lane or the next lane beyond that.

It will be recognized that the applicability of this invention is not limited to sides of the vehicle which are orthogonal to the direction of movement. Another application of the ISID is its use in the front of the vehicle for frontal collision warning. For impending collisions which would strike the more central regions of the front of the vehicle, the ISID could function as an airbag trigger in the same manner as on the side. In these scenarios, the system will provide impact time estimates, collision speed estimates, and target classification as large or small radar-cross-section, but would not momentarily lower trigger thresholds near the anticipated impact time for more reliable and earlier deployment. The impact scenario information provided from the frontally adapted ISID would also allow tailoring of the airbag deployment to provide the gentlest deployment consistent with maximum passenger protection. These embodiments could thus provide lifesaving and injury reduction by earlier, more gentle, deployment of the airbag system.

Figure 7:
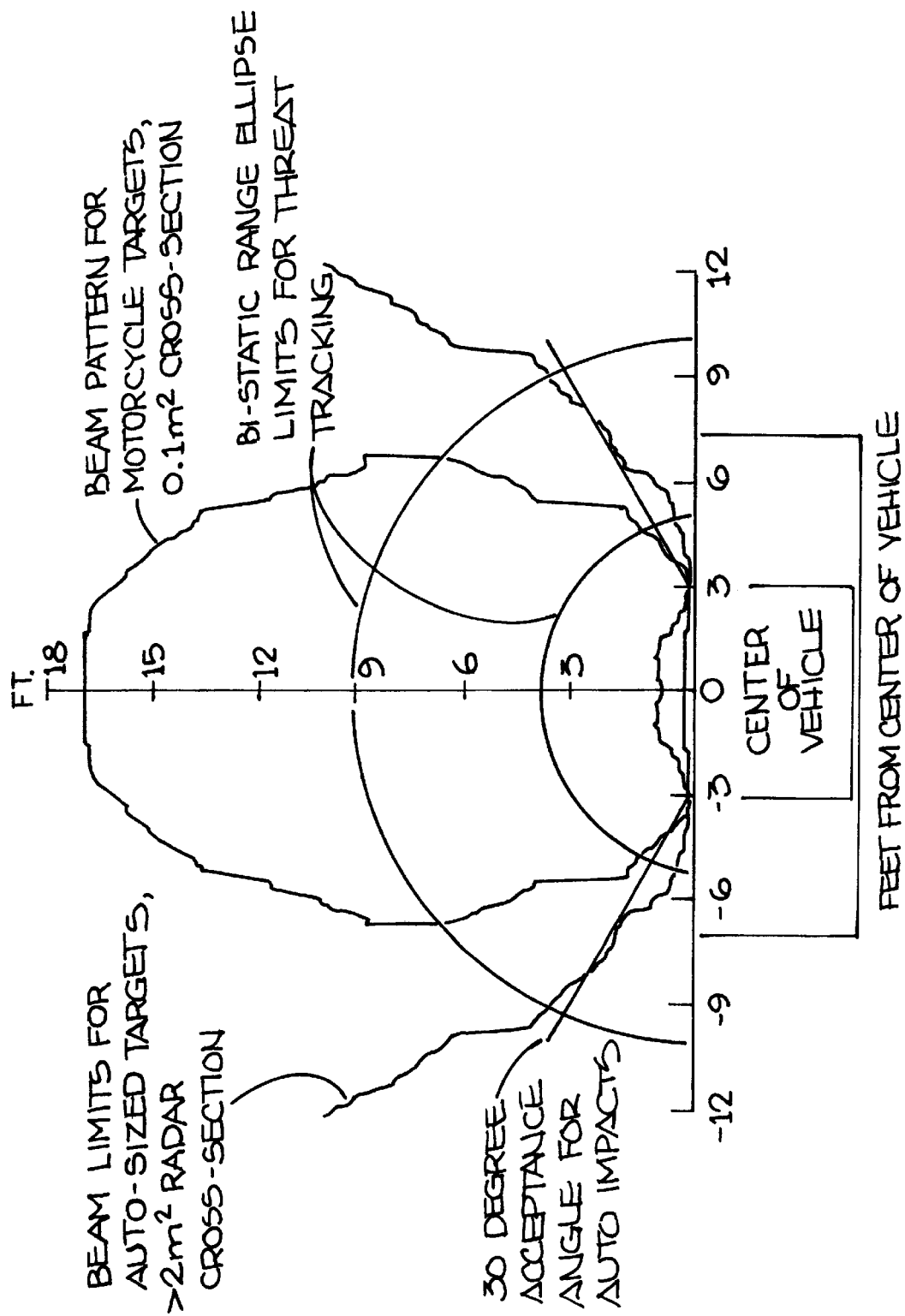
FIG. 7 presents beam patterns for large automobile and small motorcycle targets.
Figure 8:
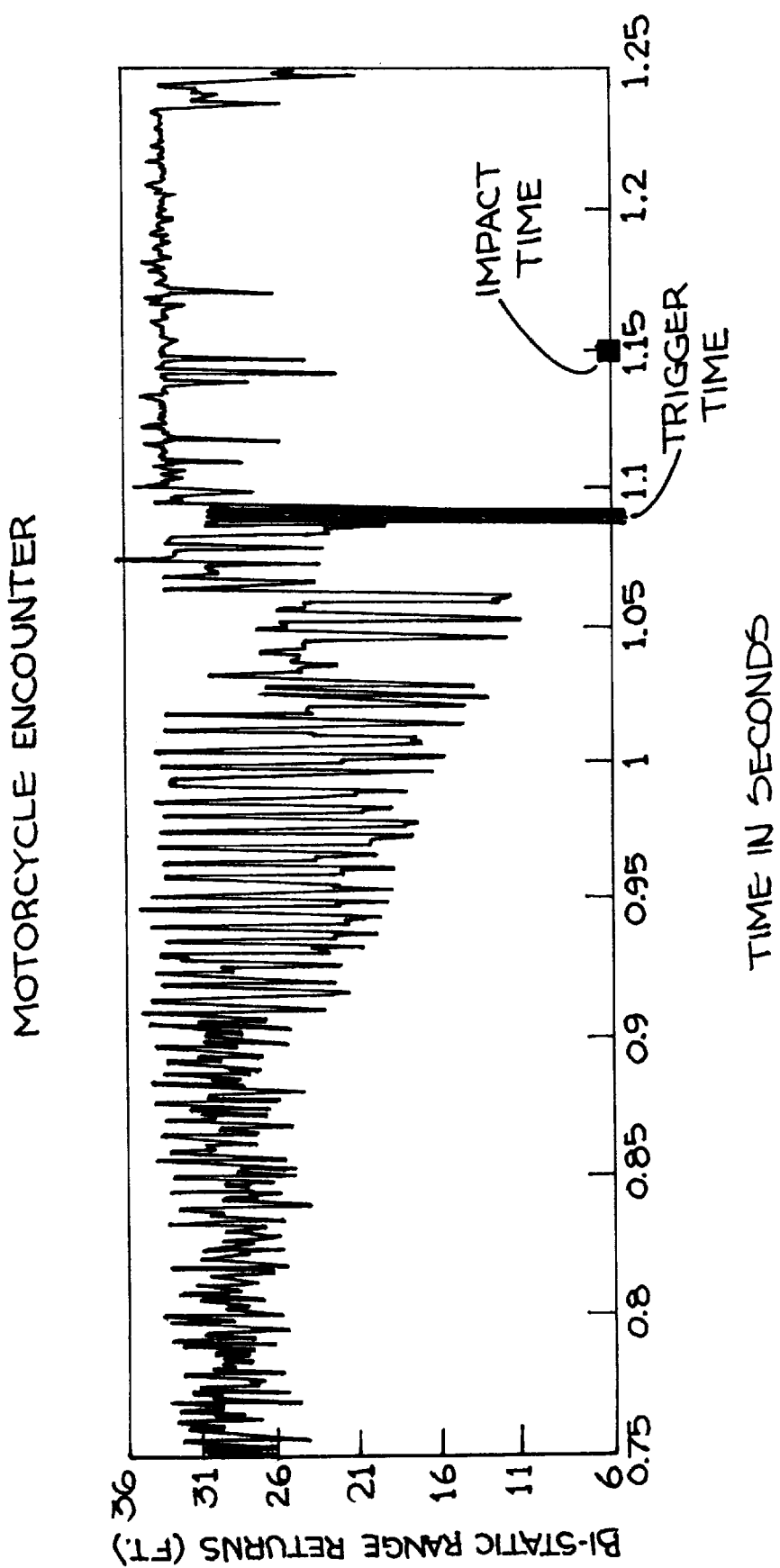
FIG. 8 shows measured returns from a simulated motorcycle encounter.

A test configuration has been developed and built in order to provide proof of the concept and an experimental test bed for data measurements. The hardware consists of a transmitter module designed to operate at the 2.44 Ghz band, stacked bow-tie transmit and receive antennae, a receiver module, an integrator/interface board, and a lap-top computer. An eight foot 1"×8" board was bolted to the side of a van-type vehicle at the door handles to serve as a hardware mount. This setup has been used for experimental road test data gathering road test in order to demonstrate false alarm immunity. Simulated impact testing is conducted with the equipment mounted on stands in an area allowing test "crash" vehicles to drive by and between the antennae. Results to date have demonstrated the feasibility of the basic system. FIG. 7 presents beam patterns for large automobile and small motorcycle targets. FIG. 8 shows measured returns from a simulated motorcycle encounter. The buildup of the signal with range closure at 30 miles per hour provided a pre-crash warning time of over 50 msec.

The foregoing description and drawings were given for illustrative purposes only, it being understood that the invention is not limited to the embodiments disclosed, but is intended to embrace any and all equivalents alternatives, modifications and rearrangements of elements falling within the scope of the invention as defined by the following claims.

I claim:

1. A radar detector for airbag triggering prior to a collision between a vehicle on a roadway and an impacting target object, comprising:

at least one set of transmitting and receiving antenna means, each said transmitting antenna being longitudinally spaced apart from said receiving antenna means, wherein each said transmitting antenna is mounted to one side of a transverse centerline passing approximately orthogonal through the longitudinal axis of said vehicle and each said receiving antenna is mounted to the opposite side of said transverse centerline;

mounting means for adjustable support of each said transmitter antenna means and said receiver antenna means so as to provide a uniform bistatic antenna pattern coverage of one or more sides of said vehicle;

at least one set of transmitter and receiver means, each said transmitter means being electrically connected to a respective transmitting antenna, and each said receiver means being electrically connected to a respective receiving antenna;

means for detection of a signal out of said receiver means, said signal resulting from radiation from said transmitter antenna being reflected from an object adjacent the side of said vehicle;

signal processing means for continuous tracking of the position of said target object relative to the side of said vehicle;

computer means for continuous calculation of the predicted time and point of impact, and means for controlling initiation of an airbag at a predetermined time before impact between said object and the side of said vehicle.

2. A radar detector for airbag triggering prior to a collision between a vehicle on a roadway and an impacting target object, as recited in claim 1, wherein said signal processing means further provides means for determination of target amplitude.

3. A radar detector for airbag triggering prior to a collision between a vehicle on a roadway and an impacting target object, as recited in claim 2, wherein said signal processing means further provides means for continuous tracking of the acceleration of said target object relative to the side of said vehicle.

4. A radar detector for airbag triggering prior to a collision between a vehicle on a roadway and an impacting target object, as recited in claim 3, wherein said signal processing means further provides means for continuous tracking of the velocity of said target object relative to the side of said vehicle.

5. A radar detector for airbag triggering prior to a collision between a vehicle on a roadway and an impacting target object, as recited in claim 4, wherein said detection means includes means for detecting the period of the modulation of the target signal by the direct signal radiation between said transmitter and associated receiver, so as to obtain an estimate of target velocity.

6. A radar detector for airbag triggering prior to a collision between a vehicle on a roadway and an impacting target object, as recited in claim 5, wherein said detection means includes means for detecting the amplitude of the modulation of the target signal by the direct signal radiation between said transmitter and associated receiver, so as to obtain an estimate of target radar cross section.

7. A radar detector for airbag triggering prior to a collision between a vehicle on a roadway and an impacting target object, as recited in claim 4, wherein said detection means includes means for momentarily disturbing the target track at non-critical ranges while varying the detection gain so as to obtain an estimate of target radar cross-section.

8. A radar detector for airbag triggering prior to a collision between a vehicle on a roadway and an impacting target object, as recited in claim 4, further comprising means for continuous direct measurement of the velocity of said object relative to the side of said vehicle.

9. A radar detector for airbag triggering prior to a collision between a vehicle on a roadway and an impacting target object, as recited in claim 8, wherein said means for continuous direct measurement of the velocity of said object relative to the side of said vehicle comprises a doppler radar.

10. A radar detector for airbag triggering prior to a collision between a vehicle on a roadway and an impacting target object, as recited in claim 8, wherein said computing means is a microprocessor.

11. A method of radar detection for airbag triggering prior to a collision between a vehicle on a roadway and an impacting target object, comprising the steps of:

providing at least one set of transmitting and receiving antenna means, each said transmitting antenna being longitudinally spaced apart from said receiving antenna means, wherein each said transmitting antenna is mounted to one side of a transverse centerline passing approximately orthogonal through the longitudinal axis of said vehicle and each said receiving antenna is mounted to the opposite side of said transverse centerline;

mounting said transmitter and receiver antenna means with adjustable support means so as to provide a uniform bistatic antenna pattern coverage of one or more sides of said vehicle;

connecting at least one set of transmitter means to a respective transmitting antenna and at least one set of receiver means to a respective receiving antenna;

detecting a signal out of said receiver means, said signal resulting from radiation from said transmitter antenna being reflected from an object adjacent the side of said vehicle;

processing the signal for continuous tracking of the position of said target object relative to the side of said vehicle;

calculating the predicted time and point of impact continuously by computer means; and controlling the initiation of an airbag at a predetermined time before impact between said object and the side of said vehicle.

12. A method of radar detection for airbag triggering prior to a collision between a vehicle on a roadway and an impacting target object, as recited in claim 11, further comprising the steps of:

locating said transmitting and associated receiving antennas relative to each other so as to approximately maintain the received direct signal radiation from said transmitter antenna approximately above the minimum detectable receiver signal level and below the minimum detectable target level; and detecting the amplitude of the modulation of the target signal by direct signal radiation between said transmitter and associated receiver, so as to obtain an estimate of target radar cross-section.

13. A method of radar detection for airbag triggering prior to a collision between a vehicle on a roadway and an impacting target object, as recited in claim 12, further comprising the steps of:

detecting the period of the modulation of the target signal by the direct signal radiation between said transmitter and associated receiver, so as to obtain an estimate of target velocity.

14. A method of radar detection for airbag triggering prior to a collision between a vehicle on a roadway and an impacting target object, as recited in claim 12, further comprising the steps of:

disturbing the target track at non-critical ranges momentarily while varying the detection gain so as to obtain an estimate of target velocity.

15. A method of radar detection for airbag triggering prior to a collision between a vehicle on a roadway and an impacting target object, as recited in claim 12, further comprising the steps of:

measuring the velocity of said object relative to the side of said vehicle by continuous direct measurement means.

16. A method of radar detection for airbag triggering prior to a collision between a vehicle on a roadway and an impacting target object, as recited in claim 15, wherein said steps of direct measurement of the velocity of said object relative to the side of said vehicle comprises a doppler radar.

* * * * *